United States Patent [19]

Isoe et al.

[11] Patent Number: 4,826,739
[45] Date of Patent: May 2, 1989

[54] MAGNETIC RECORDING MEDIUM

[75] Inventors: Noboru Isoe; Tetsuo Mizumura, both of Toride; Kunio Wakai, Ibaraki, all of Japan

[73] Assignee: Hitachi Maxell, Ltd., Osaka, Japan

[21] Appl. No.: 79,528

[22] Filed: Jul. 30, 1987

[30] Foreign Application Priority Data

Aug. 1, 1986 [JP] Japan .................. 61-179889

[51] Int. Cl.⁴ .................. G11B 5/04; G11B 5/72
[52] U.S. Cl. .................. 428/695; 427/131; 428/694; 428/900
[58] Field of Search .................. 427/130, 131; 428/695, 428/694, 900

[56] References Cited

U.S. PATENT DOCUMENTS 3,993,824 11/1976 Shirahata .................. 427/130
4,499,138 2/1985 Yamamoto .................. 427/131
4,670,333 6/1987 Miyoshi .................. 427/131

FOREIGN PATENT DOCUMENTS 070520 4/1985 Japan .
60-263318 12/1985 Japan .
61-00921 1/1986 Japan .

Primary Examiner—Paul J. Thibodeau
Attorney, Agent, or Firm—Antonelli, Terry & Wands

[57] ABSTRACT

A magnetic recording medium comprising a substrate, a magnetic layer provided thereon, a passivated film formed on the surface of said magnetic layer, and a lubricant-containing back-coat layer whose pH is adjusted to 6.3 or more on the back of said substrate.

13 Claims, 1 Drawing Sheet

F I G. 1
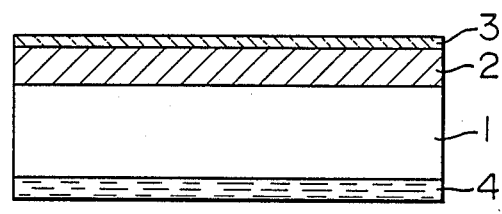

MAGNETIC RECORDING MEDIUM

FIELD OF THE INVENTION AND RELATED ART STATEMENT

Field of the Invention

This invention relates to a magnetic recording medium and, more particularly, to a magnetic recording medium of the ferromagnetic thin metal film type which is excellent in corrosion resistance and travelling properties, being kept from the corrosion caused by the back-coat layer, that is, a lubricant layer provided on the back of substrate.

Related Art Statement

The magnetic recording medium comprising a substrate and, formed thereon or on an interposed undercoat, a magnetic layer of thin ferromagnetic metal film containing cobalt as principal constituent is excellent in high-density recording characteristics but, on the other hand, has a problem of deterioration in corrosion resistance, beause the cobalt in the surface of magnetic layer is exposed to the atmosphere. In the prior art, in order to solve the above problem, the cobalt in the surface is subjected to passivation treatment by oxidation such as formation of a protective layer comprising cobalt oxide such as $Co_3O_4$ by heat treatment of the surface of magnetic layer (U.S. Pat. No. 3,460,968), or by exposing the surface to an ozone atmosphere to form a complex oxide such as that of $Co_3O_4$ and $Co_2O_3$ [Japanese Patent Application "Kokai" (Laid-Open) No. 63,031/84] or by forming a protection layer containing cobalt oxides such as CoO and $Co_3O_4$ by the glow discharge treatment of the surface [Japanese Patent Application "Kokai" (Laid-Open) No. 41,439/83].

In order to improve their travelling performance, conventional magnetic recording media having ferromagnetic thin metal films of the cobalt alloy type have been constructed in such a manner that the substrate, which is a component of the media, is provided on the back with a backcoat of lubricant layer. Such a magnetic recording medium, however, has a disadvantage in that when a magnetic recording medium in tape form is wound on a reel, that is, in the form of reeled tape, the thin ferromagnetic metal layer of the cobalt alloy type, which is a magnetic layer provided on the surface of the medium, is in close contact with a backcoat layer provided on the back of a substrate and is liable to be affected by the backcoat layer. If the backcoat becomes acidic due to the atmospheric moisture, the protective layer of passivated cobalt film is easily destructed or dissolved away, resulting in corrosion of the magnetic layer and, as a consequence, deterioration in characteristics and travelling performance of the magnetic recording medium.

OBJECT AND SUMMARY OF THE INVENTION

An object of this invention is to eliminate the above-noted disadvantage of the conventional magnetic recording medium in the prior art such that the backcoat layer, which is a lubricant layer provided on the back of a substrate of the recording medium, becomes acidic due to the effect of atmospheric moisture and causes corrosion of the magnetic layer in contact with the lubricant layer, the magnetic layer comprising cobalt or an alloy containing cobalt as principal constituent; and to provide a magnetic recording medium excellent in corrosion resistance and travelling performance.

The present inventors found as a result of various experiments that when a passivated cobalt layer formed on the surface of a thin ferromagnetic metal layer, which is a magnetic layer comprising cobalt alone or cobalt as principal constituent, is exposed to an acidic solution or atmosphere of a pH value below 6.3, the passivated cobalt film becomes destroyed or dissolved away. It was further confirmed that when the backcoat layer, which is a lubricant layer in contact with the magnetic layer in the form of reeled tape, that is, a tape wound on a reel, has been adjusted to pH 6.3 or above, the passivated cobalt layer on the surface of the magnetic layer in contact with the backcoat layer was not destroyed nor dissolved even if the atmospheric moisture had been condensed on the tape. There is thus obtained a corrosion-resistant magnetic recording medium of high reliability and high durability.

BRIEF DESCRIPTION OF THE DRAWING

The FIGURE is a schematic drawing illustrating the sectional structure of a magnetic tape prepared in Example 1 according to this invention.

DETAILED DESCRIPTION OF PREFERRED EMBODIMENTS

The adjustment of pH of the backcoat, i.e. lubricant layer, according to this invention is performed by adding a suitable amount of an alkaline compound to various lubricants which form the backcoat layer and adjusting pH to a prescribed value while measuring pH by means of a pH meter. A pH value of the backcoat layer below 6.3 is undesirable because of destruction of the passivated cobalt film under acid conditions below pH 6.3. With the increase in alkalinity, the passivated cobalt film becomes more stable until the upper limit of pH 14 is reached.

As lubricants which form the backcoat layer of the present magnetic recording media, there may be mentioned those which are customarily used, such as lubricants of the aliphatic, fluorine, silicone, and hydrocarbon types. The aliphatic lubricants include fatty acids, metal salts thereof, esters thereof, fatty acid amides, and aliphatic alcohols. Examples of desirable fatty acids are lauric acid, myristic acid, palmitic acid, oleic acid, stearic acid and behenic acid. Suitable metal salts of these fatty acids include salts with metals such as lithium, sodium, calcium, magnesium, aluminum, iron, cobalt, zinc, barium and lead. As examples of fatty acid esters, mention may be made of butyl stearate, octyl myristate, stearic acid monoglycerides, palmitic acid monoglyceride, oleic acid monoglyceride, and pentaerythritol tetrastearate. Examples of desirable fatty acid amides are caproic acid amide, capric acid amide, lauric acid amide, palmitic acid amide, behenic acid amide, oleic acid amide, linolic acid amide, and methylenebisstearic acid amide. Desirable fatty alcohols include stearyl alcohol and myristyl alcohol. There are also used chlorides such as trimethylstearylammonium chloride and stearoyl chloride and amines such as stearylamine, stearylamine acetate and stearylamine hydrochloride.

Examples of desirable lubricants of the fluorine type are trichlorofluoroethylene, perfluoropolyethers, perfluoroalkyl polyethers, perfluoroalkyl carboxylic acids and the like. Examples of commercial products are Diflon #20 (Daikin Kogyo Co.), Krytox M and H, Vydex AR (Du Pont Co.), and Fomblin Z (Montedison Co.)

The lubricants of the silicone type are silicone oils and modified silicone oils. The hydrocarbon lubricants include paraffins, squalane and waxes.

The backcoat layer, that is, lubricant layer may contain additives such as rust preventives in addition to at least one of the above-listed lubricants constituting the lubricant layer.

In adjusting the pH value of the backcoat layer by use of the above lubricants, if the pH of the lubricant being used is 6.3 or above, said lubricant can be used as such, whereas when the pH of the lubricant is below 6.3, the lubricant is used after having been adjusted to a prescribed pH value by the addition of an alkaline compound such as, for example, sodium hydroxide, potassium hydroxide or sodium hydrogencarbonate. The adjusted lubricant is dissolved in a suitable solvent such as, for example, toluene, methyl isobutyl ketone, methyl ethyl ketone, cyclohexanone, ethyl acetate, isopropyl alcohol, "Fleon", tetrahydrofuran, dimethylformamide, or dioxane and the resulting solution is applied by coating, spraying or dipping to form a backcoat layer adjusted to pH 6.3 or above. The alkaline compounds to be added to adjust the pH value of the backcoat layer include the above-noted sodium hydroxide and the like. In addition, there may be used any of the inorganic or organic compounds which do not destroy nor dissolve the passivated cobalt film formed on the magnetic layer and which can control the pH value within the range of from 6.3 to 14.

EXAMPLES

The invention is further illustrated in detail hereunder with reference to Examples and the accompanying Drawing.

EXAMPLE 1

A magnetic tape of the structure as shown in the FIGURE was prepared by the following procedure.

A thin ferromagnetic metal film layer 2, 1500 Å in film thickness, comprising Co-20 wt-% Ni alloy was evaporated at an oblique incident angle on a substrate of polyethylene terephthalate film 1, 9 μm in thickness, in a vacuum of $6 \times 10^{-5}$ Torr while introducing oxygen. The film on which the metal layer was formed was continuously wound up in roll form. The roll film was exposed to the atmosphere and again placed in a closed vessel. The vessel was then evacuated to 50 Torr and filled with oxygen to a pressure of 1.3 atmosphere. The sealed vessel was left standing for 150 hours to passivate the surface of thin ferromagnetic metal film layer 2, resulting in passivated cobalt film 3. A lubricant Fomblin Z, DIOL (Montedison Co.), which had been adjusted to pH 6.5 with sodium hydrogencarbonate, was applied to the backside of the substrate 1 of polyethylene terephthalate film to form a backcoat layer 4. The resulting product was cut to a prescribed width to obtain a magnetic tape.

EXAMPLE 2

A magnetic tape was prepared in the same manner as in Example 1, except that Vydex 84 (Du Pont Co.) was used as the lubricant in place of Fomblin Z, DIOL and the backcoat layer was adjusted to pH 7.3.

EXAMPLE 3

A magnetic tape was prepared in the same manner as in Example 1, except that lauric acid was used as the lubricant in place of Fomblin Z, DIOL and the backcoat layer was adjusted to pH 7.5.

COMPARATIVE EXAMPLE 1

A magnetic tape was prepared in the same manner as in Example 1, except that myristic acid was used as the lubricant in place of Fomblin Z, DIOL and the backcoat layer was adjusted to pH 4.8.

COMPARATIVE EXAMPLE 2

A magnetic tape was prepared in the same manner as in Example 1, except that stearic acid was used as the lubricant in place of Fomblin Z, DIOL and the backcoat layer was adjusted to pH 6.1.

The magnetic tapes prepared in Examples and Comparative Examples were each wound up in reel form to obtain reeled magnetic tapes, in which the backcoat layer and the surface of magnetic layer were kept in contact with each other. The tapes were left standing in an atmosphere of high temperature and high humidity at 60° C. and 90% RH (relative humidity). The change with time in friction coefficient of the magnetic tape surface was measured. The corrosion resistance and the travelling performance were evaluated by the visual inspection of the surface condition of magnetic layer. The results were as shown in Table 1. The coefficient of friction was measured by a sliding type friction tester. The test results were expressed in terms of kinetic friction coefficient.

TABLE 1

|  | PH of back-coat layer | Friction coefficient and change in surface condition of magnetic layer Number of days of standing in atmosphere of 60° C. and 90% RH | | | |
|---|---|---|---|---|---|
|  |  | 0 | 10 | 20 | 30 |
| Example 1 | 6.5 | 0.26 | 0.24 Metallic luster | 0.25 | 0.25 |
| Example 2 | 7.3 | 0.27 | 0.26 Metallic luster | 0.26 | 0.26 |
| Example 3 | 7.3 | 0.28 | 0.27 Metallic luster | 0.27 | 0.27 |
| Comparative Example 1 | 4.8 | 0.35 Metallic luster | >1.0 Corrosion all over the surface | — | — |
| Comparative Example 2 | 6.1 | 0.33 Metallic luster | 0.82 Corrosion specks | >1.0 Corrosion all over the surface | — |

As is apparent from Table 1, the reeled magnetic tape having a backboard layer of PH 6.3 or above according to this invention showed even after a long storage in a high-temperature and high-humidity atmosphere an excellent corrosion resistance and a substantially unchanged friction coefficient, indicative of steady travelling performance, high durability, and high reliability of the magnetic recording medium of this invention.

In the above Examples, sodium hydrogencarbonate was used as the alkaline compound for adjusting pH of the backcoat layer. It was confirmed that the same effect as that shown in the above Examples was exhibited when sodium hydroxide or potassium hydroxide was used or when other alkaline inorganic or organic compounds not destroying the passivated cobalt film were used.

In the above Examples, commercial products such as Fomblin Z, DIOL (Montedison Co.) and Vydex 84 (Du Pont Co.) were used as the lubricant constituting the backcoat layer. It was also confirmed that the same effect as that shown in the above Examples was exhibited when aliphatic lubricants, fluorine-containing lubricants, silicone lubricants, or hydrocarbon lubricants were used.

As the metallic materials for the thin ferromagnetic metal film used in magnetic recording media of this invention, there may be used cobalt alone or alloys comprising cobalt as principal constituent such as Co - Ni, Co - Cr, Co - P, Co - Pd, Co - Fe, Co - Ni - P, Co - Fe - Cr, Co - Ni - Cr, Co - Fe - Ni, Co - Ti, and Co - Cu.

The materials for the substrate which can be used in the present magnetic recording medium are polyethylene terephthalate and other common plastic films such as synthetic resin films including polyamide, polyimide, and polyester films and composite plastic films.

EFFECT OF THE INVENTION

As described in detail above, even when stored in the form of reeled magnetic tape for a long period of time in an atmosphere of high temperature and high humidity, the magnetic recording medium of this invention provided with a backcoat layer having an adjusted pH value is kept from destruction of the corrosion resistance of the passivated cobalt film formed on the surface of a thin ferromagnetic metal film layer which is a magnetic layer comprising cobalt alone or cobalt as principal constituent. As a consequence, the excellent corrosion resistance and travelling performance are retained, indicating high durability and high reliability of the magnetic recording medium of this invention.

What is claimed is:

1. A magnetic recording medium comprising a substrate, a magnetic layer provided on said substrate and containing CO or a CO alloy as a principal constituent, a passivated cobalt film formed on the surface of said magnetic layer, and a back-coat layer comprising a lubricant, the back-coat layer having a pH adjusted to 6.3 or more and being provided on the back of said substrate.

2. A magnetic recording medium according to claim 1, wherein the back-coat layer contains at least one of the aliphatic lubricants, fluorine-base lubricants, silicone lubricants and hydrocarbon lubricants.

3. A magnetic recording medium according to claim 2, wherein the back-coat layer contains at least either of a perfluoroalkylcarboxylic acid of a perfluoroalkyl polyether.

4. A magnetic recording medium according to claim 3, wherein the back-coat layer further contains sodium hydrogencarbonate.

5. A magnetic recording medium according to claim 1, wherein the back-coat layer further comprises at least one alkaline compound in an amount sufficient to adjust the pH of the lubricant to 6.3 to 14.

6. A magnetic recording medium according to claim 5, wherein the alkaline compound includes at least one of the sodium hydroxide, potassium hydroxide and sodium hydrogencarbonate.

7. A magnetic recording medium according to claim 5, wherein said alkaline compound is an inorganic compound.

8. A magnetic recording medium according to claim 5, wherein said alkaline compound is an organic compound.

9. A magnetic recording medium according to claim 5, wherein said alkaline compound is sodium hydroxide.

10. A magnetic recording medium according to claim 5, wherein said alkaline compound is potassium hydroxide.

11. A magnetic recording medium according to claim 5, wherein said alkaline compound is sodium hydrogen carbonate.

12. A magnetic recording mediumm according to claim 1, wherein said substrate is a polyethylene terephthalate film.

13. A magnetic recording medium according to claim 1, wherein said substrate is a film made of a material selected from the group consisting of polyamide, polyimide and polyester.

* * * * *